United States Patent
Wikström et al.

(10) Patent No.: US 11,363,584 B2
(45) Date of Patent: *Jun. 14, 2022

(54) TRANSPORT BLOCK SIZE CONFIGURATION

(71) Applicant: TELEFONAKTIEBOLAGET LM ERICSSON (PUBL), Stockholm (SE)

(72) Inventors: Gustav Wikström, Täby (SE); Jonas Fröberg Olsson, Ljungsbro (SE); Alexey Shapin, Luleå (SE); Kittipong Kittichokechai, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,467

(22) Filed: Apr. 21, 2020

(65) Prior Publication Data

US 2020/0252920 A1 Aug. 6, 2020

Related U.S. Application Data

(63) Continuation of application No. 16/292,211, filed on Mar. 4, 2019, now Pat. No. 10,631,284, which is a continuation of application No. PCT/IB2018/057418, filed on Sep. 25, 2018.

(60) Provisional application No. 62/566,205, filed on Sep. 29, 2017.

(51) Int. Cl.
| | |
|---|---|
| *H04W 4/00* | (2018.01) |
| *H04W 72/04* | (2009.01) |
| *H04L 1/00* | (2006.01) |
| *H04W 76/11* | (2018.01) |
| *H04L 5/00* | (2006.01) |

(52) U.S. Cl.
CPC ........ *H04W 72/042* (2013.01); *H04L 1/0003* (2013.01); *H04L 1/0007* (2013.01); *H04L 5/006* (2013.01); *H04W 76/11* (2018.02); *H04L 5/0044* (2013.01); *H04L 5/0053* (2013.01)

(58) Field of Classification Search
CPC ... H04W 72/042; H04W 76/11; H04L 1/0003; H04L 1/0007
See application file for complete search history.

(56) References Cited

U.S. PATENT DOCUMENTS

| | | | |
|---|---|---|---|
| 2012/0163319 A1* | 6/2012 | Roessel | H04L 1/0006 370/329 |
| 2013/0195031 A1 | 8/2013 | Haseler et al. | |

(Continued)

FOREIGN PATENT DOCUMENTS

| | | |
|---|---|---|
| CA | 2943557 A1 | 8/2016 |
| EP | 3151460 A1 | 4/2017 |
| WO | 2016/122756 A1 | 8/2016 |

OTHER PUBLICATIONS

LG Electronics, "Discussio non resource allocation and TBS determination", 3GPP TSG RAN WG1 Meeting NR#3, R1-1715885, Sep. 18-21, 2017.

*Primary Examiner* — Siren Wei

(57) ABSTRACT

A wireless communication device determines a base value for a transport block size, determines a scaling factor for the transport block size, applies the scaling factor to the base value to determine the transport block size, and receives information from a radio access node according to the determined transport block size.

16 Claims, 18 Drawing Sheets

(56) References Cited

U.S. PATENT DOCUMENTS

| | | | |
|---|---|---|---|
| 2013/0308504 A1* | 11/2013 | Nimbalker | H04L 5/003 370/281 |
| 2015/0071099 A1 | 3/2015 | Yi et al. | |
| 2015/0195069 A1 | 7/2015 | Yi et al. | |
| 2015/0195819 A1* | 7/2015 | Kwon | H04W 72/085 370/329 |
| 2015/0358111 A1* | 12/2015 | Marinier | H04L 27/0008 370/329 |
| 2016/0183302 A1* | 6/2016 | Chen | H04W 24/08 370/329 |
| 2017/0208575 A1* | 7/2017 | Chen | H04W 72/0406 |
| 2019/0082431 A1* | 3/2019 | Yi | H04L 5/0055 |
| 2019/0124689 A1* | 4/2019 | Yang | H04W 74/0808 |
| 2019/0372719 A1* | 12/2019 | Talarico | H04W 72/042 |

\* cited by examiner

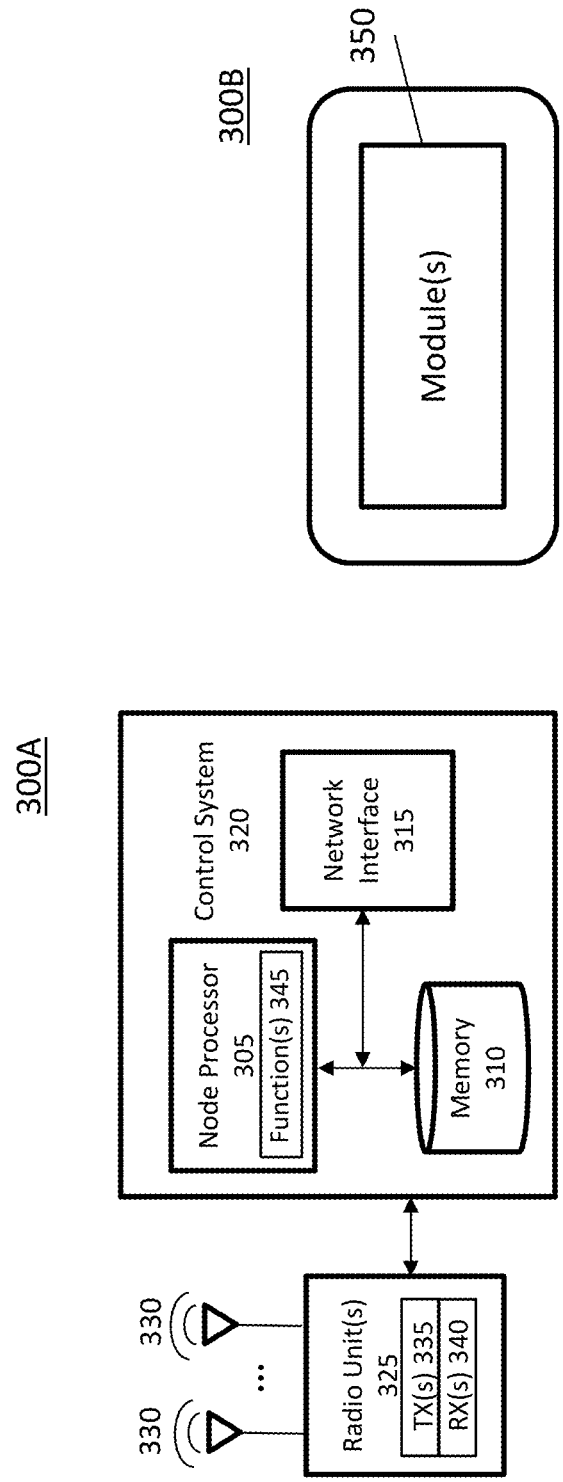

TRANSPORT BLOCK SIZE CONFIGURATION

CROSS-REFERENCE TO RELATED APPLICATIONS

This application is a continuation application of U.S. application Ser. No. 16/292,211, filed May 4, 2019, and granted as U.S. Pat. No. 10,631,284 on Apr. 21, 2020, which is a continuation application of International Patent Application No. PCT/IB2018/057418, filed Sep. 25, 2018, which claims priority to U.S. Provisional Application No. 62/566,205 filed Sep. 29, 2017, the disclosures of which are hereby incorporated herein by reference in their entirety.

TECHNICAL FIELD

The disclosed subject matter relates generally to telecommunications. Certain embodiments relate more particularly to concepts such as 3GPP New Radio (NR), Long Term Evolution (LTE), retransmission, hybrid automatic repeat request (HARQ), transport block size (TBS) and transmission time interval (TTI).

BACKGROUND

In cellular wireless systems, such as those using Long Term Evolution (LTE) and New Radio (NR) standards, resources for UL transmissions are normally scheduled by a network node (e.g., eNB or gNB). This can be done dynamically, for instance by an eNB scheduling an UL transmission per transmission time interval (TTI). Alternatively, this can be done using a semi persistent scheduling (SPS) framework, so that multiple TTIs are granted at the same time prior to a data transmission.

Configuration of SPS typically includes periodicity of the grant, allocation and modulation and coding scheme (MCS) in subsequent SPS occasions. Other types of grant-free transmissions can also be envisioned where some or all resources are granted semi-statically to a user equipment (UE), so that the UE can start transmitting over resources whenever needed without a need to ask for a dynamic grant.

SUMMARY

In certain embodiments of the disclosed subject matter, techniques and technologies are provided for configuring and indicating a TBS to a UE. In some embodiments, for example, a scaling factor for a TBS is dynamically or semi-statically configured by a network. The configuration can be specified for different services, TTI lengths, directions, transmission modes, and downlink control information (DCI) types, for example. The UE applies the scaling factor to compute the TBS for a transmission based on the MCS and the default TBS table or function. MCS subsets can be semi-statically configured for a certain service or DCI type. For UEs running multiple services with different configurations the configuration to used may be indicated by a bit field in the DCI Certain embodiments are presented in recognition of shortcomings associated with conventional techniques and technologies, such as the following examples. The TBS needs to be adapted to the number of OFDM symbols in a transmission, the TTI length. If not, the code rate with be higher than intended. Also, for certain services, the code rate should be lower than the nominal to improve transmission robustness.

Certain embodiments may provide potential benefits compared to conventional techniques and technologies, such as the following examples. Some methods or apparatuses provide a unified solution for calculating TBS in scenarios of varying TTI length, and for services requiring different code rates.

In certain embodiments of the disclosed subject matter, a method of operating a wireless communication device comprises determining a base value for a transport block size, determining a scaling factor for the transport block size, applying the scaling factor to the base value to determine the transport block size, and receiving information from a radio access node according to the determined transport block size.

In certain related embodiments, determining the scaling factor for the transport block size comprises receiving downlink control information (DCI) indicating the scaling factor.

In certain related embodiments, applying the scaling factor to the base value to determine the transport block size comprises multiplying the base value by the scaling factor to produce a scaled value, and rounding up the scaled value.

In certain related embodiments, applying the scaling factor to the base value to determine the transport block size comprises multiplying the base value by the scaling factor to produce a scaled value, and rounding down the scaled value to bytes.

In certain related embodiments, the scaling factor is configured according to a service type associated with the transmission.

In certain related embodiments, the wireless communication device applies the scaling factor to the base value in response to detection of a radio network temporary identifier (RNTI) associated with transport block size (TBS) scaling.

In certain related embodiments, the scaling factor is configured according to at least one of a transmission time interval, a service type, a type of downlink control information (DCI), a transmission direction, a transmission mode, a user equipment (UE) class, and a block error rate (BLER) target.

In certain related embodiments, the wireless communication device determines the base value according to downlink control information (DCI).

In some embodiments of the disclosed subject matter, a wireless communication device comprises processing circuitry, memory, and transceiver circuitry collectively configured to determine a base value for a transport block size, determine a scaling factor for the transport block size, apply the scaling factor to the base value to determine the transport block size, and receive information from a radio access node according to the determined transport block size.

In certain related embodiments, determining the scaling factor for the transport block size comprises receiving downlink control information (DCI) indicating the scaling factor.

In certain related embodiments, applying the scaling factor to the base value to determine the transport block size comprises multiplying the base value by the scaling factor to produce a scaled value, and rounding up the scaled value.

In certain related embodiments, applying the scaling factor to the base value to determine the transport block size comprises multiplying the base value by the scaling factor to produce a scaled value, and rounding down the scaled value to bytes.

In certain related embodiments, the scaling factor is configured according to a service type associated with the transmission.

In certain related embodiments, the wireless communication device applies the scaling factor to the base value in response to detection of a radio network temporary identifier (RNTI) associated with transport block size (TBS) scaling.

In certain related embodiments, the scaling factor is configured according to at least one of a transmission time interval, a service type, a type of downlink control information (DCI), a transmission direction, a transmission mode, a user equipment (UE) class, and a block error rate (BLER) target.

In certain related embodiments, the wireless communication device determines the base value according to downlink control information (DCI).

In some embodiments of the disclosed subject matter, a method of operating a radio access node comprises transmitting downlink control information (DCI) to a wireless communication device, the DCI comprising information for determining a base value and a scaling factor for a transport block size, and transmitting information to the wireless communication device according to the transport block size.

In certain related embodiments, the transport block is determined by multiplying the base value by the scaling factor to produce a scaled value, and rounding up the scaled value.

In certain related embodiments, the transport block is determined by multiplying the base value by the scaling factor to produce a scaled value, and rounding down the scaled value to bytes.

In certain related embodiments, the scaling factor is determined according to a service type associated with the transmission.

In certain related embodiments, the DCI further comprises a radio network temporary identifier (RNTI) associated with transport block size (TBS) scaling.

In certain related embodiments, the scaling factor is determined according to at least one of a transmission time interval, a service type, a type of downlink control information (DCI), a transmission direction, a transmission mode, a user equipment (UE) class, and a block error rate (BLER) target.

In some embodiments of the disclosed subject matter, a radio access node comprises processing circuitry (305), memory (310) and transceiver circuitry (325) collectively configured to transmit downlink control information (DCI) to a wireless communication device, the DCI comprising information for determining a base value and a scaling factor for a transport block size, and transmit information to the wireless communication device according to the transport block size.

In certain related embodiments, the transport block is determined by multiplying the base value by the scaling factor to produce a scaled value, and rounding up the scaled value.

In certain related embodiments, the transport block is determined by multiplying the base value by the scaling factor to produce a scaled value, and rounding down the scaled value to bytes.

In certain related embodiments, the scaling factor is determined according to a service type associated with the transmission.

In certain related embodiments, the DCI further comprises a radio network temporary identifier (RNTI) associated with transport block size (TBS) scaling.

In certain related embodiments, the scaling factor is determined according to at least one of a transmission time interval, a service type, a type of downlink control information (DCI), a transmission direction, a transmission mode, a user equipment (UE) class, and a block error rate (BLER) target.

BRIEF DESCRIPTION OF THE DRAWINGS

The drawings illustrate selected embodiments of the disclosed subject matter. In the drawings, like reference labels denote like features.

Figure (FIG. 1 illustrates communication system according to an embodiment of the disclosed subject matter.

FIG. 3A illustrates a radio access node (or network node) according to an embodiment of the disclosed subject matter.

FIG. 3B illustrates a radio access node according to another embodiment of the disclosed subject matter.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Certain embodiments provide techniques and technologies to scale TBS using semi-statically configured factors, enabling a desired code rate for transmissions with different TTI length for different services. Certain embodiments also define subsets of the MCS list for computing the TBS.

The described embodiments may be implemented in any appropriate type of communication system supporting any suitable communication standards and using any suitable components. As one example, certain embodiments may be implemented in a communication system such as that illustrated in FIG. 1. Although certain embodiments are described with respect to 3GPP systems (e.g., LTE or NR) and related terminology, the disclosed concepts are not limited to 3GPP system. Additionally, although reference may be made to the term "cell", the described concepts may also apply in other contexts, such as beams used in Fifth Generation (5G) systems, for instance.

Figure 1:
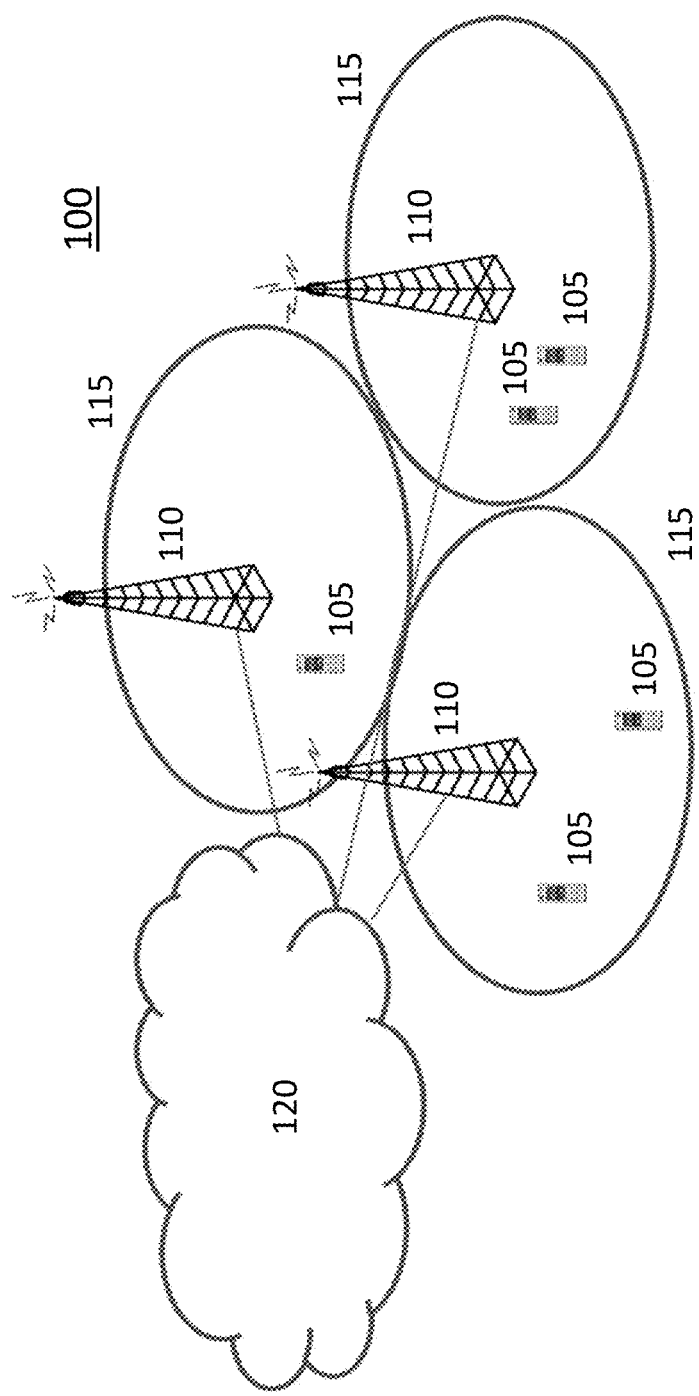

Referring to FIG. 1, a communication system 100 comprises a plurality of wireless communication devices 105 (e.g., UEs, machine type communication [MTC]/machine-to-machine [M2M] UEs) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2B:
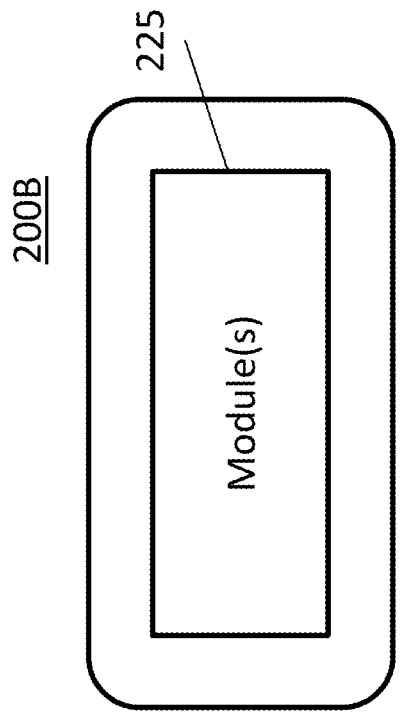
FIG. 2B illustrates a wireless communication device according to another embodiment of the disclosed subject matter.
Figure 2A:
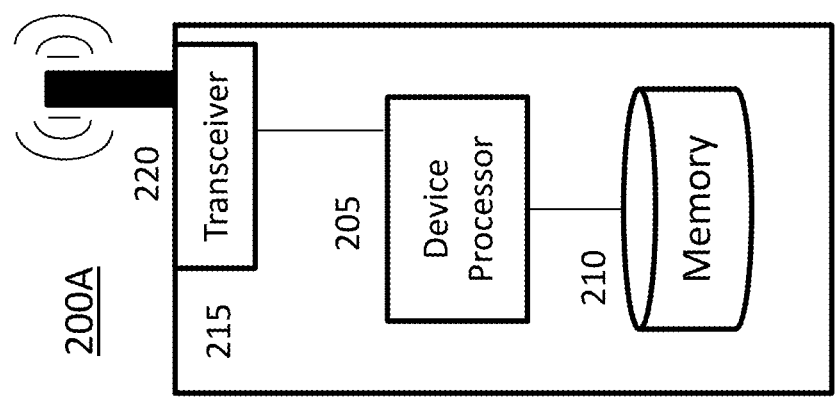
FIG. 2A illustrates a wireless communication device according to an embodiment of the disclosed subject matter.

Although wireless communication devices 105 may represent communication devices that include any suitable combination of hardware and/or software, these wireless communication devices may, in certain embodiments, represent devices such as those illustrated in greater detail by FIGS. 2A and 2B. Similarly, although the illustrated radio access node may represent network nodes that include any suitable combination of hardware and/or software, these nodes may, in particular embodiments, represent devices such those illustrated in greater detail by FIGS. 3A, 3B and 4.

Referring to FIG. 2A, a wireless communication device 200A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as memory 210. Alternative embodiments may include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 2A.

Referring to FIG. 3A, a radio access node 300A comprises a control system 320 that comprises a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a Node B, an eNodeB, gNodeB and/or any other type of network node may be provided by node processor 305 executing instructions stored on a computer-readable medium, such as memory 310 shown in FIG. 3A. Alternative embodiments of radio access node 300 may comprise additional components to provide additional functionality, such as the functionality described herein and/or related supporting functionality.

Referring to FIG. 3B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 3A.

Figure 4:
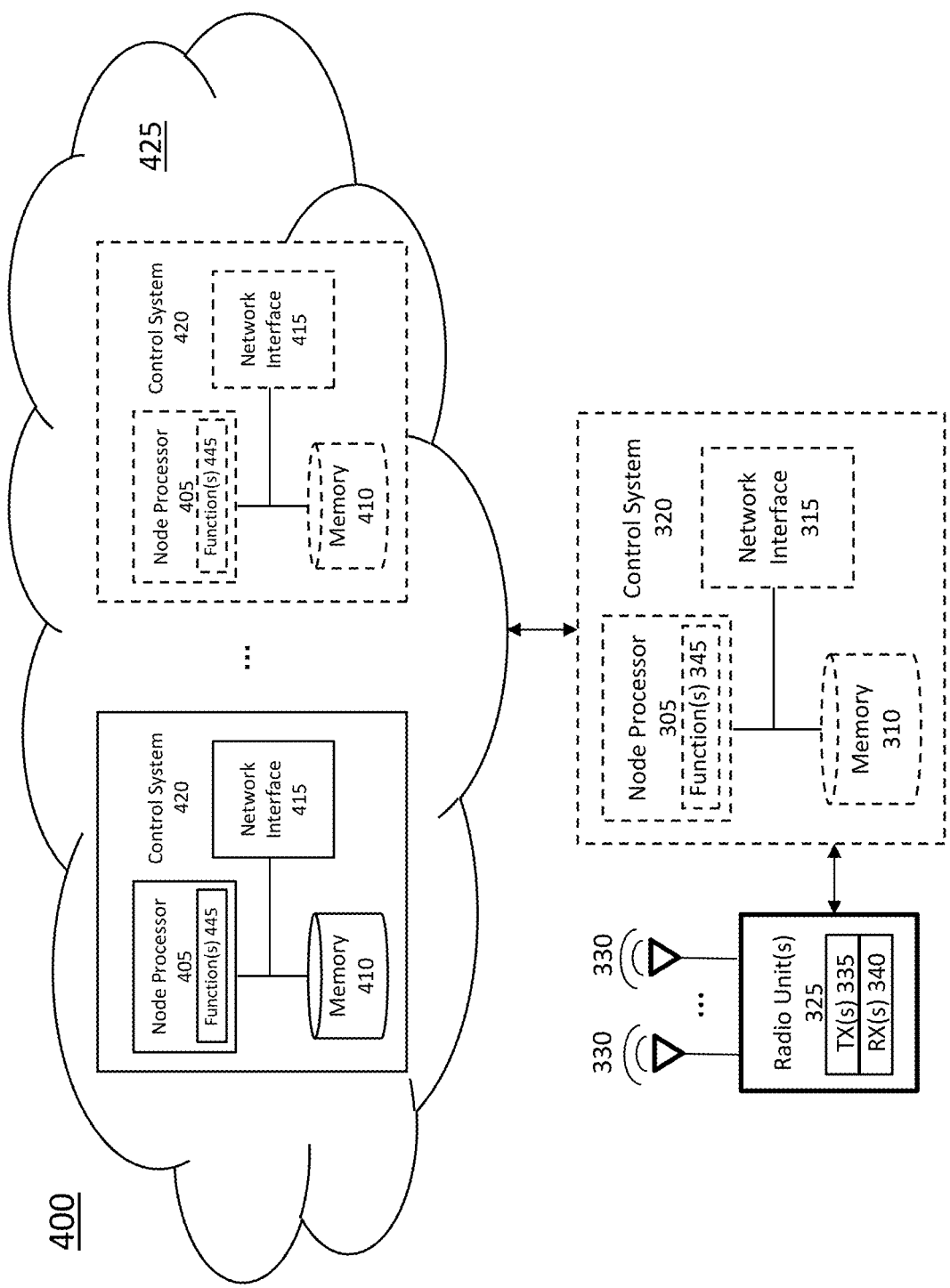
FIG. 4 illustrates a radio access node according to yet another embodiment of the disclosed subject matter.

FIG. 4 is a block diagram that illustrates a virtualized radio access node 400 according to an embodiment of the disclosed subject matter. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described in relation to FIG. 3A.

Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program comprises instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein.

The following description presents various concepts as "Aspects". The use of this terminology is merely for convenience and is not intended to be limiting or indicative of any hierarchy, separation, interaction etc. between the described concepts. In fact, concepts described in connection with different aspects may be combined in various ways as described below and/or as may be envisioned by those skilled in the art.

Aspect 1

In some embodiments, a scaling factor Lambda is configured for a UE. The configuration can be done semi-statically over RRC, or dynamically over DCI, for instance. In one example, the UE would be configured during attachment to the network.

The UE applies the configured Lambda when computing a TBS value for a transmission, based on a nominal TBS0 such that TBS=TBS0*Lambda. In this context, the term "nominal" may refer to e.g. a base value or initial value to be used in a computation or determination in which other values are to be derived.

The value of Lambda may be determined based on any of several alternative factors. For instance:
  In some embodiments, a value of Lambda is configured per TTI length.
  In some embodiments, a value of Lambda is configured per service type.
  In some embodiments, a value of Lambda is configured per DCI type.
  In some embodiments, a value of Lambda is configured per direction.
  In some embodiments, a value of Lambda is configured per transmission mode.
  In some embodiments, a value of Lambda is configured per UE class.
  In some embodiments, a value of Lambda is configured per BLER target.
  In some embodiments, a value of Lambda is configured based on a combination of the indicators above, e.g., a combination of service type and DCI type.

In some embodiments, Lambda is configured as two different parameters: Lambda=alpha*beta, where alpha is set per TTI length and direction, and beta is set per service type or BLER target. Both can be semi-statically configured for a UE. In addition, alpha or beta separately can be connected to DCI type such that the reception of a certain DCI means applying a factor alpha or beta, or both.

The "beta" part in above embodiments can be specified by CQI report, for example. In one example, the UE reports CQI containing a scaling factor beta which depends on its present channel condition.

The beta part can also be indicated dynamically in the DCI depending on service type or BLER target or both.

As one example, the network configures Lambda for a DCI for URLLC transmission of length 2 OFDM symbols to be 2*12*0.5/N0, where N0 is a nominal value, effectively reducing the number of bits in the transmission to be adapted to the transmission length, and also reducing the code rate by half.

In some embodiments, Lambda is not directly configured, but computed as N/N0, where the value N is configured instead of Lambda, and N0 is a nominal value of REs per PRB. In an embodiment N0 is a function of TTI, e.g. such that N0(14)=12*12 REs, and N0(7)=6*12 REs per PRB.

Thus the UE can be configured with Lambda (TTI, Service, Direction, DCI, Transmission mode, UE class) or N (TTI, Service, Direction, DCI, Transmission mode, UE class), where not all parameters need to be used.

Aspect 2

In certain embodiments, a UE receives a DCI for a transmission. Based on this, it computes a nominal TBS value, TBS0. The nominal value can be from a table or a formula. The UE also computes Lambda or N as described above, based on DCI input (DCI type, TTI length, direction, transmission mode, service type, UE class). The UE then computes the TBS=Lambda*TBS0. Alternatively, the UE calculates TBS=N*X, where X corresponds to TBS0/N0, that is the number of PRBs times the modulation times the code rate times the number of layers. Here, X can also be found in a table or computed from a formula.

In some embodiments, the computed TBS is corrected for CRC.

In some embodiments, the computed TBS is corrected for additional control overhead.

In some embodiments, the computed TBS is rounded off, rounded up, or rounded down to bytes (B).

Aspect 3

In certain embodiments, the UE is configured with a mapping between a subset of MCS and the full MCS set. The mapping can be semi-statically configured over RRC for a certain DCI type, TTI length, direction, transmission mode, service type or UE class. The mapping can be a list of length(MCS subset) and contain the MCS indices in the full set. In one example the configuration can look like: {0, 2, 4, 6, 8, 10, 12, 14}. New numeration of MCSs in a subset can be applied based on index of MCS in the set. Before indexing the list of MCS should be sorted, e.g. in ascending order. This list of 8 MCS in the subset can then be indicated with fewer bits in the relevant DCI. Another way of MCS mapping configuration is signaling a bitmap on full MCS set, where each bit shows either MCS is used in subset or not and a bit position corresponds to MCS number in full MCS set, e.g. the same configuration as before can be signaled like {1010101010101000 . . . }.

Aspect 4

In certain embodiments, a UE receives a DCI with a configured MCS subset. It then reads the MCS field and maps the index to the configured list in the subset to get the index corresponding to the full set. It then uses this full-set index to compute the TBS.

Aspect 5

In certain embodiments, the UE can be configured with several "TBS/MCS configurations", which are sets of parameters, mentioned in connection with Aspects 1-4. Each configured set should have an index. The UE receives a DCI comprising a bit field indicating a "TBS/MCS configuration" index. The indicated configuration is then used by the UE when determining the TBS/MCS. Aspect 5 enables the UE to run multiple services where data for each of the services (with different "TBS scaling") may be assigned using a common DCI format. In the simplest form, one bit is used to indicate scaling or no scaling applied to the TBS.

In some embodiments, the indication is instead associated to the address (RNTI) used to convey the DCI to the UE, such that the normal RNTI is not associated with TBS scaling, while a configured Scaling-RNTI is associated with scaling, and upon detection of a DCI sent to this address the UE applies the scaling.

FIGS. 5-9 illustrate methods according to various embodiments of the disclosed subject matter. These methods may include e.g. certain concepts described in relation to Aspects 1-5, respectively. Additionally, these methods may be variously performed by e.g. a network node and/or UE as described elsewhere herein. For instance, the described operations, functions, or steps may be performed by a combination of processing circuitry, memory, and/or transceiver circuitry as illustrated and/or described elsewhere herein. Moreover, in addition to the described operations, functions or steps, the methods may further comprise communication (e.g. transmitting and/or receiving information between a network node and a UE) and related operations (e.g., rate matching, modulation and coding, etc.) performed according to various information described below, such as a TBS produced by application of a scaling factor. For instance, in each method in which TBS is determined, scaled, adjusted, etc., the resulting TBS may be used for communication by a UE or network node. Such use may include, e.g., performing physical channel processing using the determined TBS.

Figure 5:
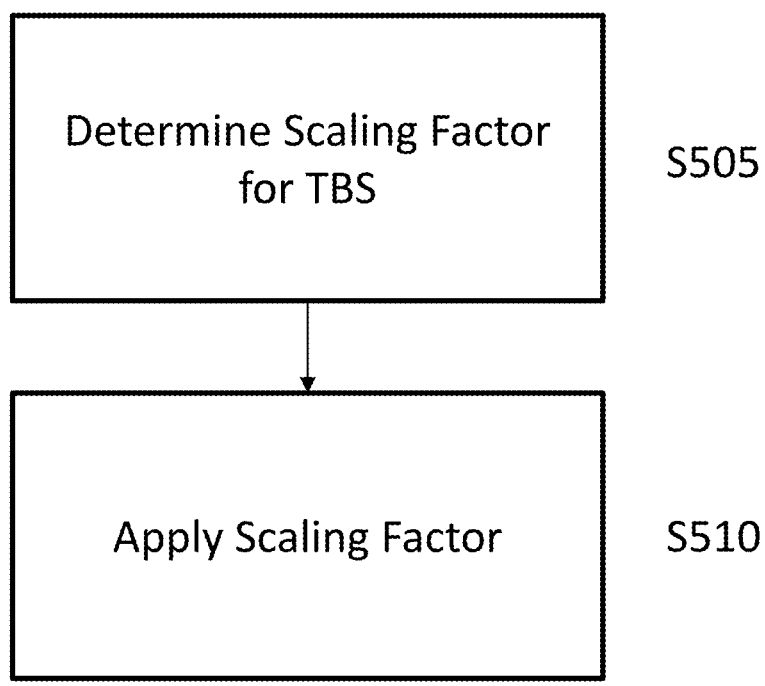
FIG. 5 illustrates a method according to an embodiment of the disclosed subject matter.

Referring to FIG. 5, a method 500 comprises determining a scaling factor for a TBS (S505), and applying the scaling factor to the TBS (S510). Determining the scaling factor may comprise e.g., a network node determining a value of lambda (or "N") as described herein, and applying the scaling factor to the TBS may comprise, for instance, multiplying the scaling factor by a nominal value or base value of TBS to produce a scaled value for TBS. Applying the scaling factor may further comprise or be accompanied by various alternative adjustments to the TBS or scaled value of TBS, such as correction for CRC, control overhead, rounding, etc., as described above. The determination of the scaling factor, and the related scaling or other adjustments to the TBS may be performed either at the network node, or at UE, for instance. Moreover, applying the scaling factor, configuring other parameters to be used when determining the scaling factor, etc., may involve communication between the network node and the UE, such as RRC signaling or other forms of transmission as described above.

Figure 6:
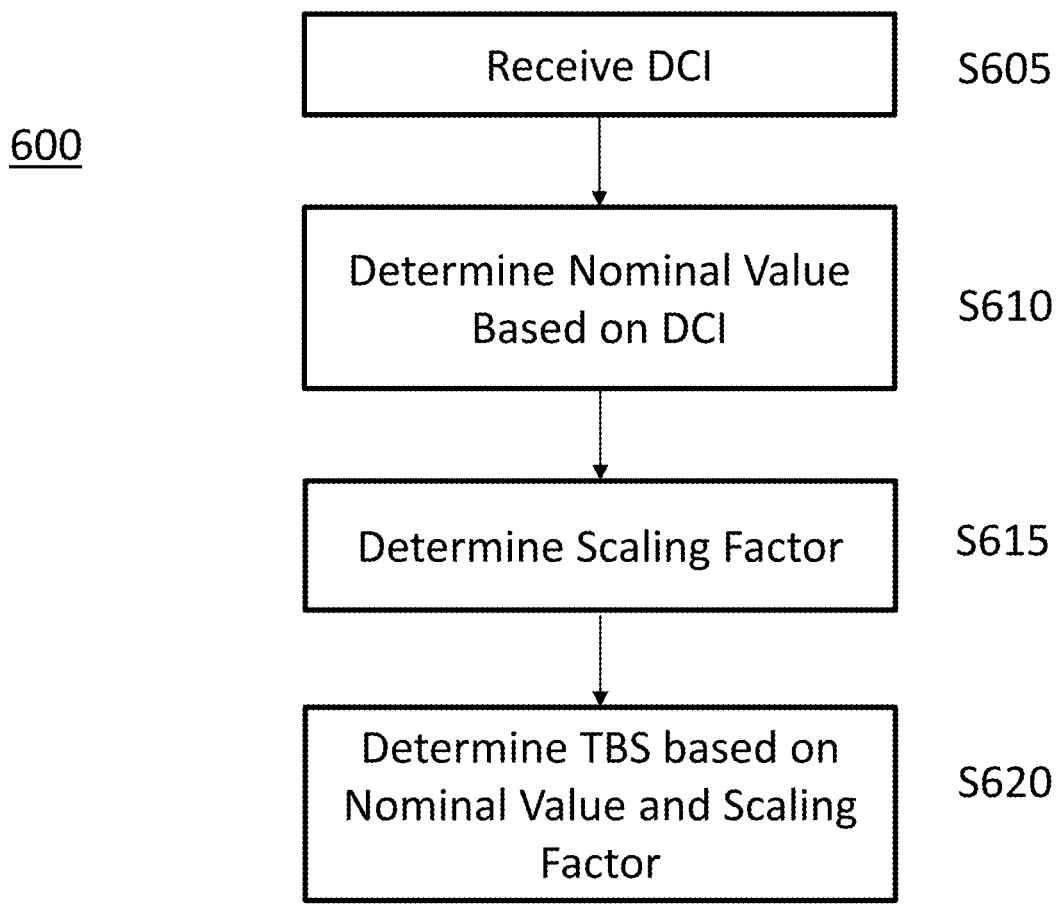
FIG. 6 illustrates a method according to an embodiment of the disclosed subject matter.

Referring to FIG. 6, a method 600 comprises a UE receiving DCI from a network node (S605), determining a nominal value or base value for TBS based on the received DCI and/or other applicable information (S610), determining a scaling factor for the TBS based on the DCI and/or other applicable information (S615), and determining a TBS based on the nominal value and the scaling factor (S620).

Figure 7:
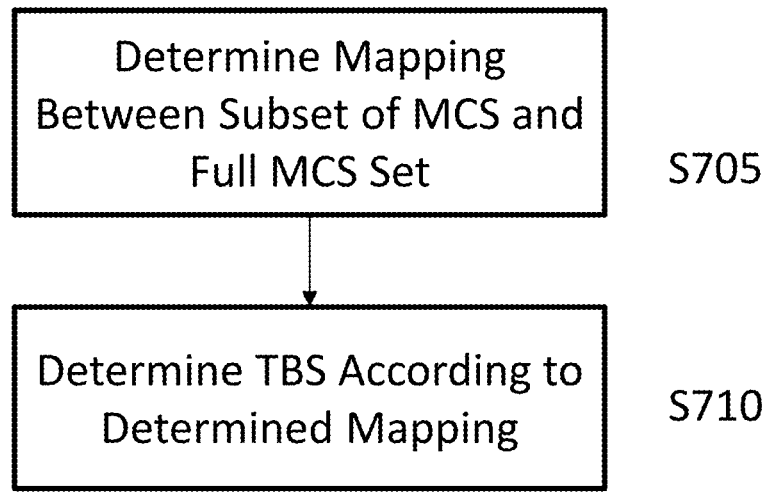
FIG. 7 illustrates a method according to an embodiment of the disclosed subject matter.

Referring to FIG. 7, a method 700 comprises determining a mapping between a subset of MCS and a full MCS set (S705), and determining a TBS according to the determined mapping (S710). The determination of the mapping and TBS may be performed as described above in relation to various aspects, such as e.g. Aspect 4 and/or 5.

Figure 8:
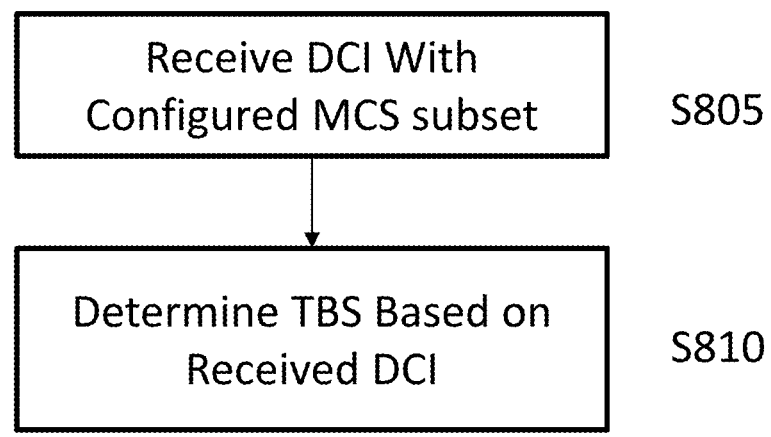
FIG. 8 illustrates a method according to an embodiment of the disclosed subject matter.

Referring to FIG. 8, a method 800 comprises receiving DCI with a configured MCS subset (S805), and determining TBS according to the received DCI (S810). In this context, the determining of the TBS may comprise e.g. reading an MCS field from the DCI to identify the subset, mapping an index associated with the MCS field to a configured list to get an index corresponding to a full MCS set, and using the index corresponding to the full MCS set to compute the TBS, as described above in relation to Aspect 4.

Figure 9:
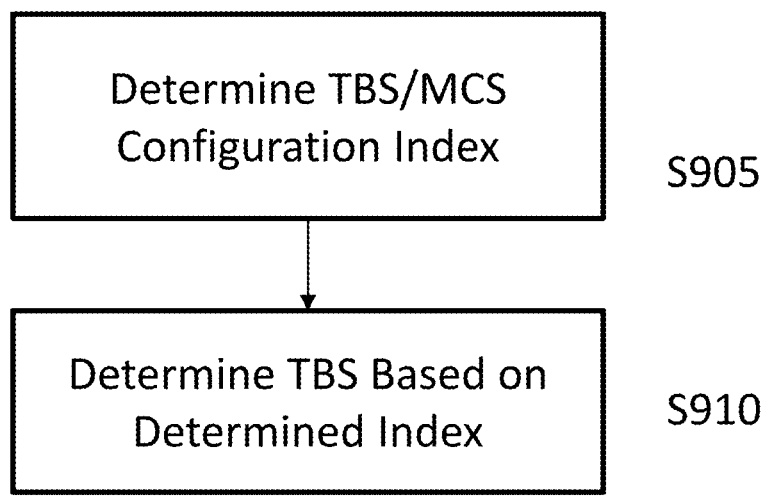
FIG. 9 illustrates a method according to an embodiment of the disclosed subject matter.

Referring to FIG. 9, a method 900 comprises determining a TBS/MCS configuration (S905), and determining a TBS based on the determined configuration (S910). In this context, the determining of the TBS/MCS configuration and the TBS may be performed according to the description of Aspect 5, for instance. In other words, determining the TBS/MCS configuration may comprise e.g. a UE receiving DI comprising a bit field that indicates a TBS/MCS configuration, and so on.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 10:
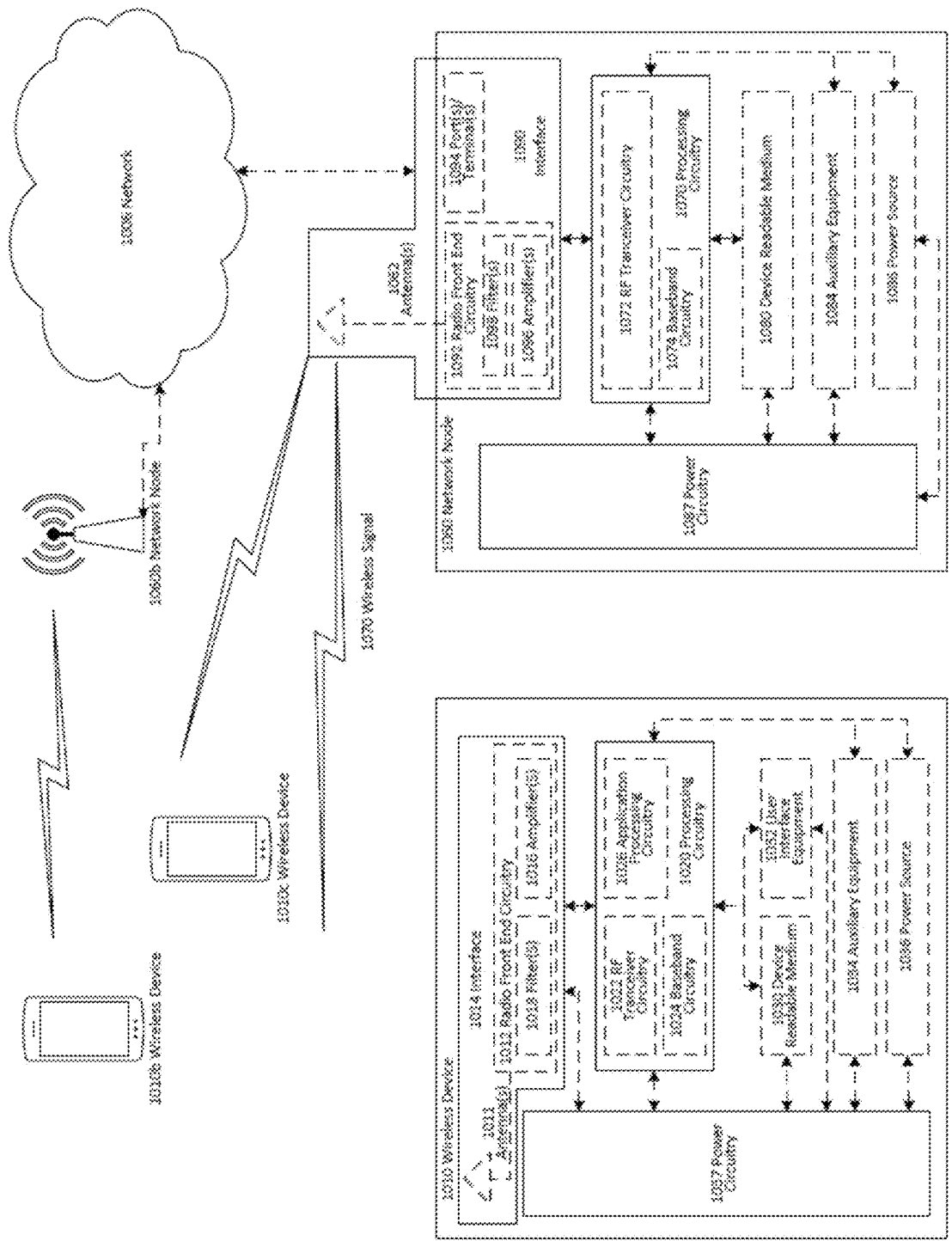
FIG. 10 illustrates a wireless network according to an embodiment of the disclosed subject matter.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
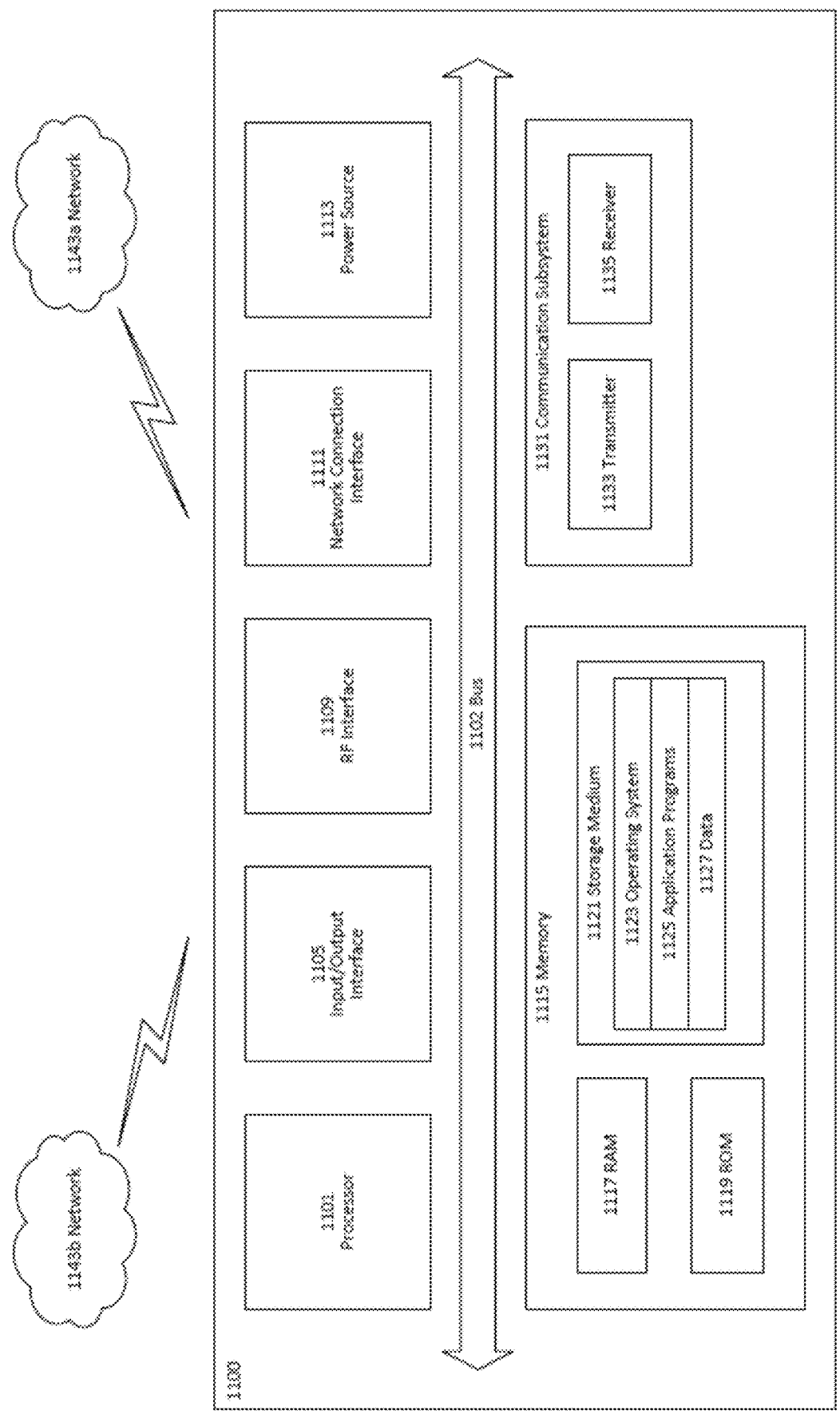
FIG. 11 illustrates a user equipment according to an embodiment of the disclosed subject matter.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3$^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
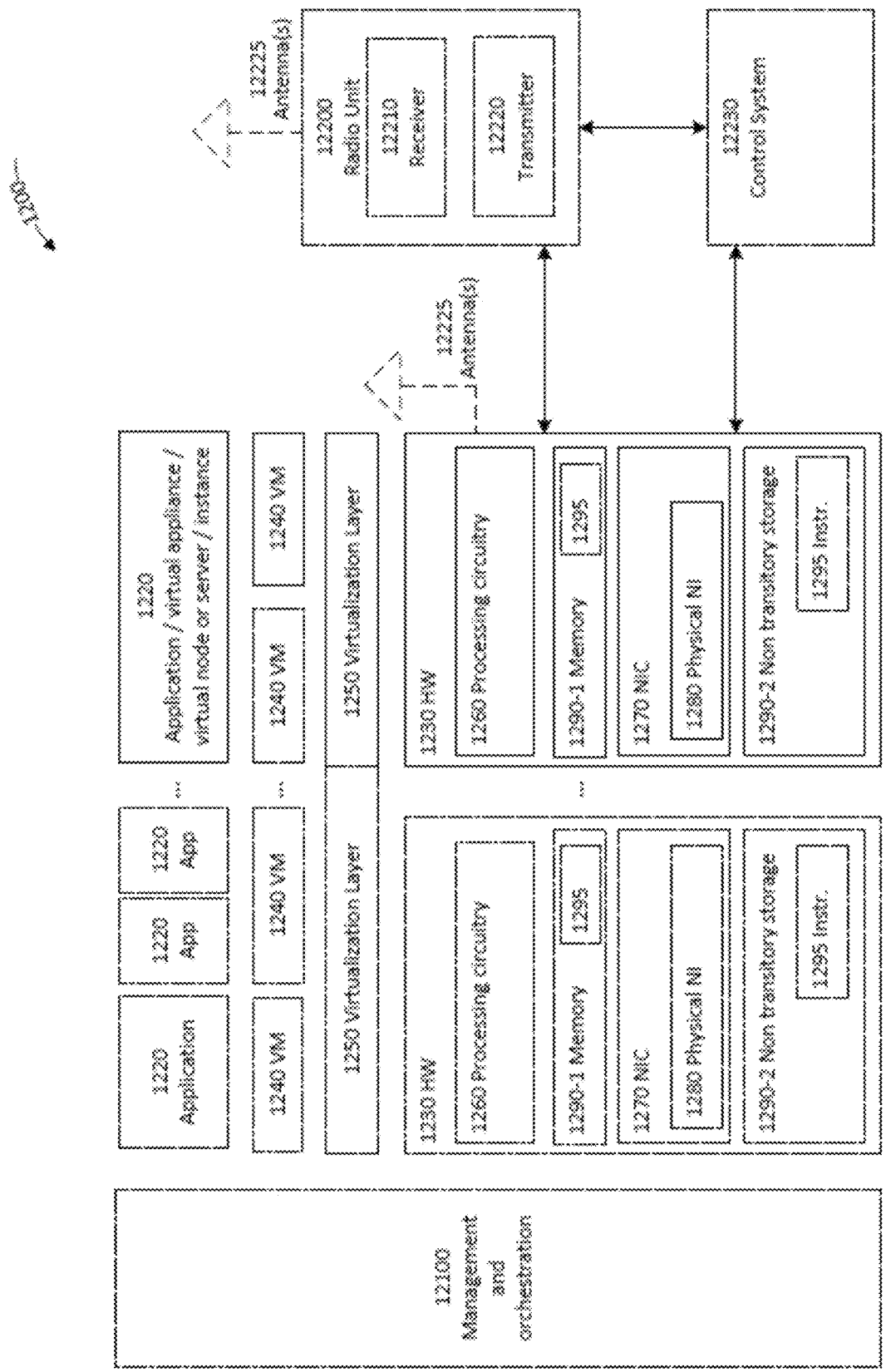
FIG. 12 illustrates a virtualization environment according to an embodiment of the disclosed subject matter.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE))

where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
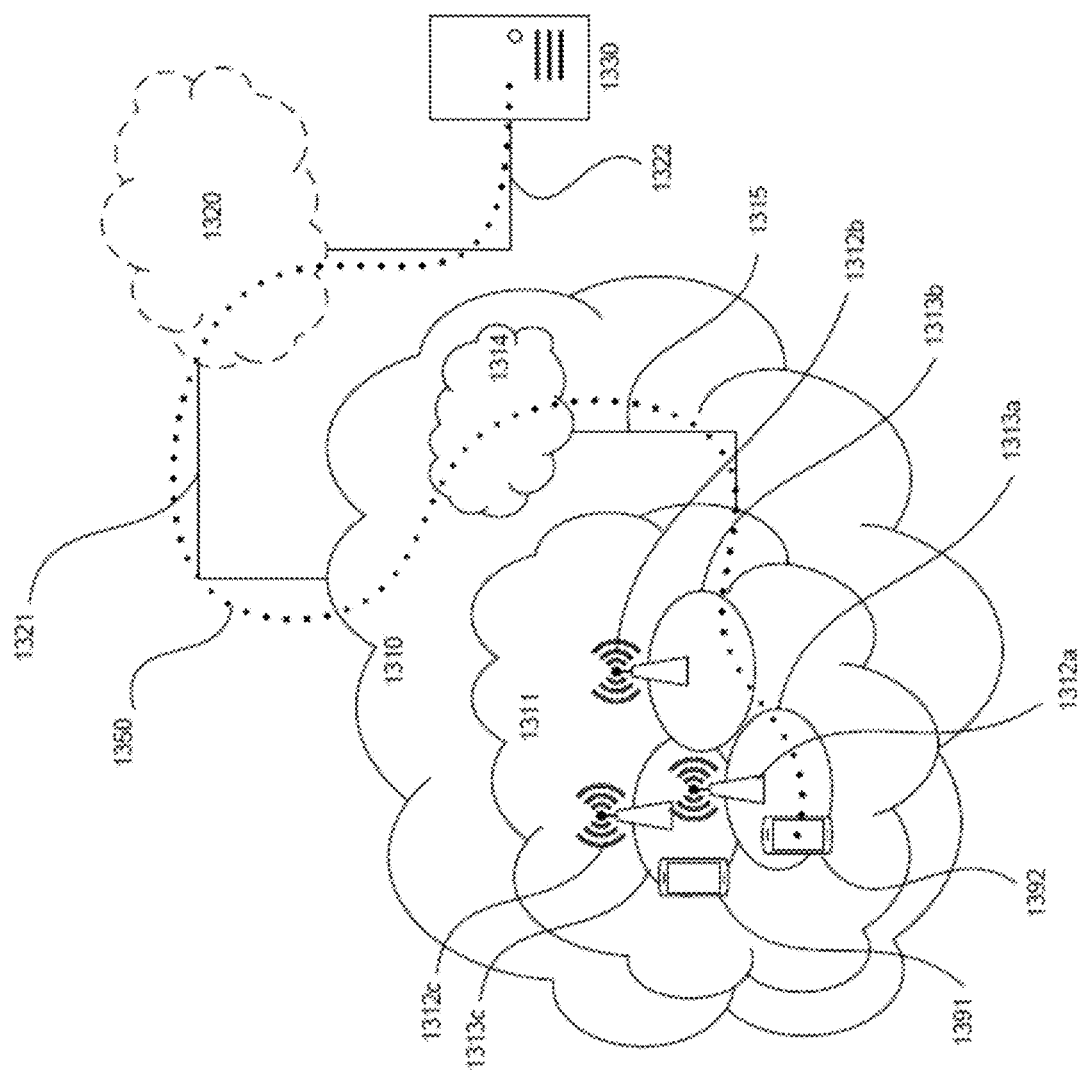
FIG. 13 illustrates a telecommunication network connected via an intermediate network to a host computer according to an embodiment of the disclosed subject matter.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
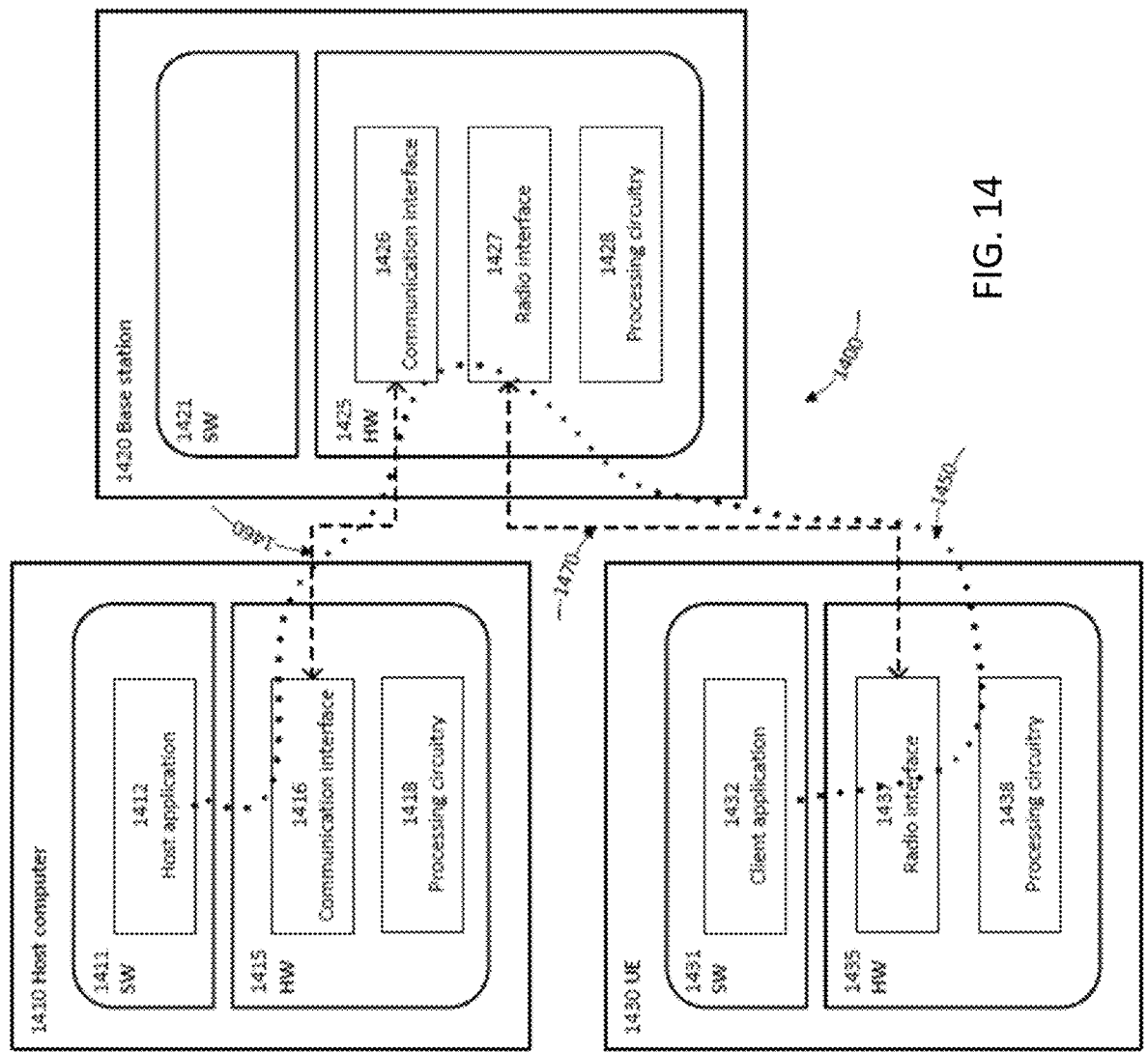
FIG. 14 illustrates a host computer communicating via a base station with a user equipment over a partially wireless connection according to an embodiment of the disclosed subject matter.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve physical channel processing and thereby provide benefits such as improvements in user data delivery.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
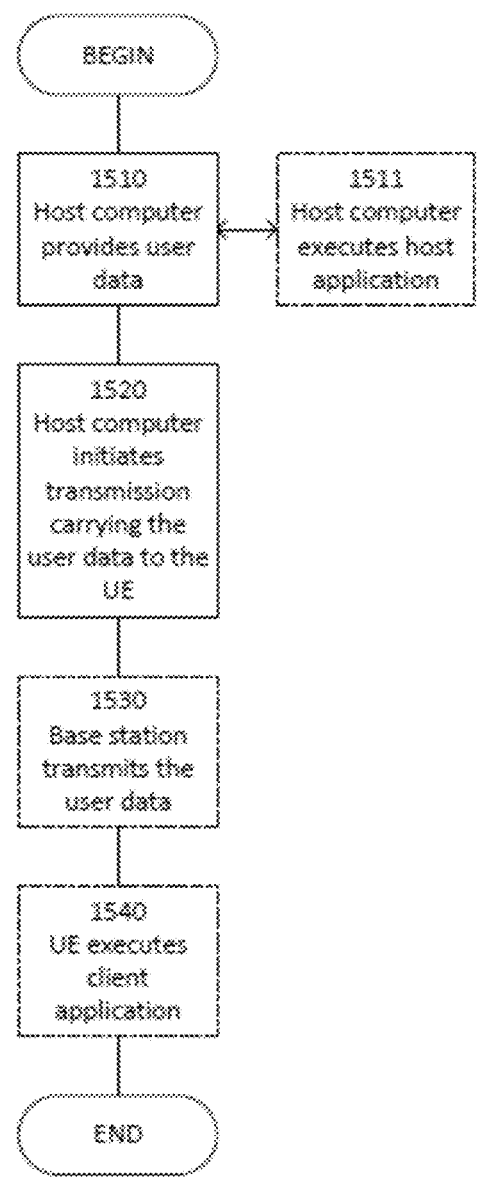
FIG. 15 illustrates a method implemented in a communication system including a host computer, a base station and a user equipment according to an embodiment of the disclosed subject matter.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 of step 1510, the host computer provides the user data by executing a host application. In step 1520, the host computer initiates a transmission carrying the user data to the UE. In step 1530, the base station transmits to the UE the user data which was carried in the transmission that the host computer initiated, in accordance with the teachings of the embodiments described throughout this disclosure. In step 1540, the UE executes a client application associated with the host application executed by the host computer.

Figure 16:
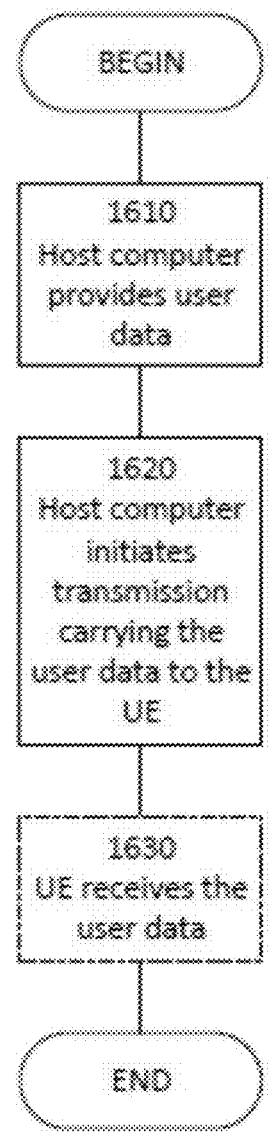
FIG. 16 illustrates a method implemented in a communication system including a host computer, a base station and a user equipment according to an embodiment of the disclosed subject matter.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630, the UE receives the user data carried in the transmission.

Figure 17:
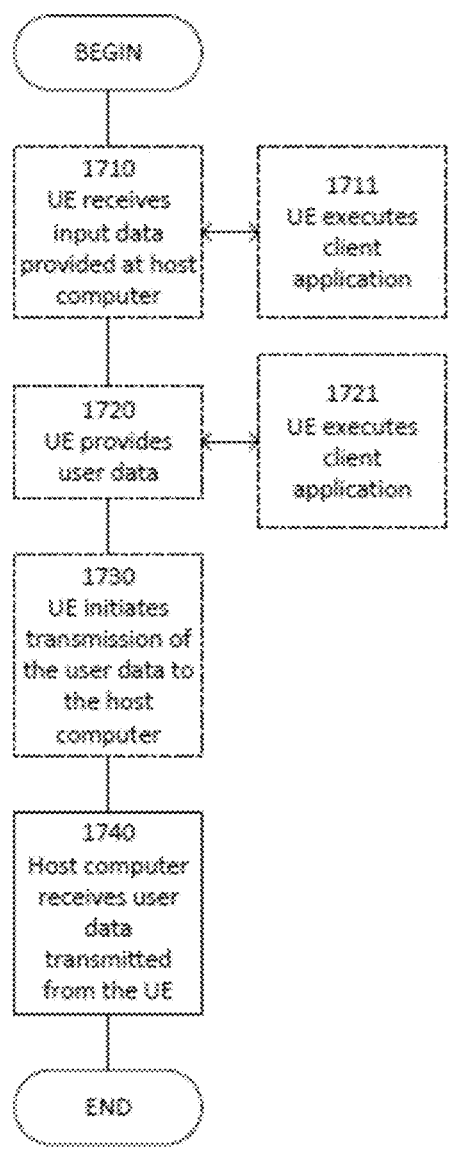
FIG. 17 illustrates a method implemented in a communication system including a host computer, a base station and a user equipment according to an embodiment of the disclosed subject matter.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710, the UE receives input data provided by the host computer. Additionally or alternatively, in step 1720, the UE provides user data. In substep 1721 of step 1720, the UE provides the user data by executing a client application. In substep 1711 of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730, transmission of the user data to the host computer. In step 1740 of the method, the host computer receives the user data transmitted from the UE, in accordance with the teachings of the embodiments described throughout this disclosure.

Figure 18:
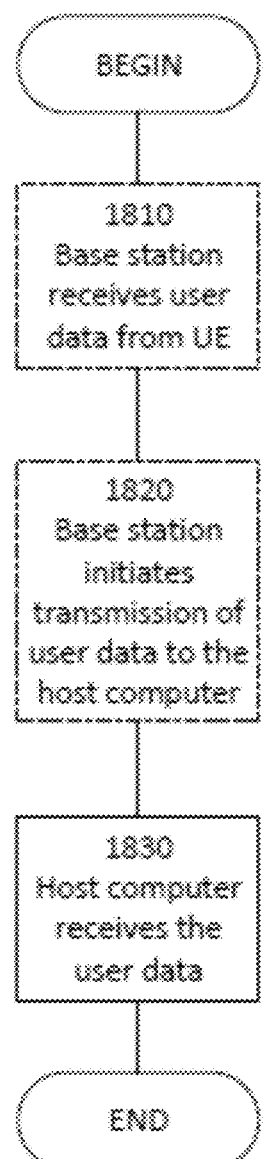
FIG. 18 illustrates a method implemented in a communication system including a host computer, a base station and a user equipment according to an embodiment of the disclosed subject matter.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810, in accordance with the teachings of the embodiments described throughout this disclosure, the base station receives user data from the UE. In step 1820, the base station initiates transmission of the received user data to the host computer. In step 1830, the host computer receives the user data carried in the transmission initiated by the base station.

While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device, comprising:
   determining a base value for a transport block size wherein determining the base value for the transport block size comprises receiving downlink control information (DCI), the base value according to the received DCI;
   determining a scaling factor for the transport block size;
   in response to detection of a radio network temporary identifier (RNTI) associated with transport block size (TBS) scaling, applying the scaling factor to the base value to determine the transport block size;
   in response to detection of a radio network temporary identifier (RNTI) not associated with transport block size (TBS) scaling, not applying the scaling factor to the base value to determine the transport block size; and
   receiving information from a radio access node according to the determined transport block size.

2. The method of claim 1, wherein applying the scaling factor to the base value to determine the transport block size comprises multiplying the base value by the scaling factor to produce a scaled value, and rounding the scaled value.

3. The method of claim 1, wherein the scaling factor is configured according to a service type associated with transmission.

4. The method of claim 1, wherein the scaling factor is configured according to at least one of a transmission time interval, a type of downlink control information (DCI), a transmission direction, a user equipment (UE) class, and a block error rate (BLER) target.

5. A wireless communication device, comprising:
   processing circuitry, memory, and transceiver circuitry collectively configured to:
   determine a base value for a transport block size wherein determining the base value for the transport block size comprises receiving downlink control information (DCI), the base value according to the received DCI;
   determine a scaling factor for the transport block size;
   in response to detection of a radio network temporary identifier (RNTI) associated with transport block size (TBS) scaling, apply the scaling factor to the base value to determine the transport block size;
   in response to detection of a radio network temporary identifier (RNTI) not associated with transport block size (TBS) scaling, not applying the scaling factor to the base value to determine the transport block size; and
   receive information from a radio access node according to the determined transport block size.

6. The wireless communication device of claim 5, wherein applying the scaling factor to the base value to determine the transport block size comprises multiplying the base value by the scaling factor to produce a scaled value, and rounding the scaled value.

7. The wireless communication device of claim 5, wherein the wireless communication device applies the scaling factor to the base value in response to detection of a radio network temporary identifier (RNTI) associated with transport block size (TBS) scaling.

8. The wireless communication device of claim 5, wherein the scaling factor is further configured according to at least one of a transmission time interval, a type of downlink control information (DCI), a transmission direction, a transmission mode, and a user equipment (UE) class.

9. The wireless communication device of claim 5, wherein the wireless communication device determines the base value according to downlink control information (DCI).

10. A radio access node, comprising:
    processing circuitry, memory and transceiver circuitry collectively configured to:
    transmit downlink control information (DCI) to a wireless communication device, the DCI comprising information for use by the wireless communication device in determining a base value and a scaling factor for a transport block size, wherein the transport block size is a product of a factor indicated by a modulation and coding scheme and the information for use by the wireless communication device comprises a radio network temporary identifier (RNTI) associated with transport block size (TBS) scaling when the wireless communication device is to apply the scaling factor and the information for use by the wireless communication device comprises a different RNTI that is not associated with TBS scaling when the wireless communication device is not to apply the scaling factor; and
    transmit information to the wireless communication device.

11. The radio access node of claim 10, the transport block is determined by multiplying the base value by the scaling factor to produce a scaled value, and rounding up the scaled value.

12. The radio access node of claim 10, the transport block is determined by multiplying the base value by the scaling factor to produce a scaled value, and rounding down the scaled value to bytes.

13. The radio access node of claim 10, wherein the scaling factor is determined according to a service type associated with transmission.

14. The radio access node of claim 10, wherein the scaling factor is determined according to at least one of a transmission time interval, a type of downlink control information (DCI), a transmission direction, a transmission mode, a user equipment (UE) class.

15. The method of claim 1, wherein the received DCI is configured with a modulation and coding scheme subset of a full modulation and coding scheme set.

16. The method of claim 15, wherein the modulation and coding scheme subset comprises an index relative to the full modulation and coding scheme set.

* * * * *